United States Patent
Chinniah et al.

(10) Patent No.: US 9,506,624 B2
(45) Date of Patent: Nov. 29, 2016

(54) LAMP HAVING LENS ELEMENT FOR DISTRIBUTING LIGHT

(71) Applicant: GE LIGHTING SOLUTIONS, LLC, East Cleveland, OH (US)

(72) Inventors: Jeyachandrabose Chinniah, Pontiac, MI (US); Thomas Clynne, East Cleveland, OH (US); Cherian Jacob, Brecksville, OH (US); Benjamin Lee Yoder, Cleveland Heights, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 14/068,414

(22) Filed: Oct. 31, 2013

(65) Prior Publication Data

US 2015/0117026 A1  Apr. 30, 2015

(51) Int. Cl.
  *F21V 5/02* (2006.01)
  *G02B 19/00* (2006.01)
  *F21V 5/04* (2006.01)
  *F21Y 101/00* (2016.01)

(52) U.S. Cl.
  CPC ............ *F21V 5/02* (2013.01); *F21V 5/043* (2013.01); *F21V 5/045* (2013.01); *G02B 19/0009* (2013.01); *G02B 19/0061* (2013.01); *F21Y 2101/00* (2013.01); *G02B 19/0014* (2013.01)

(58) Field of Classification Search
  CPC .......... F21V 5/045; F21V 5/046; F21V 5/08; F21V 5/02; F21V 5/04; F21V 5/048; F21V 5/043; F21V 5/00; F21Y 2101/02; F21Y 2115/10; G02B 19/0009; G02B 19/0061; G02B 19/0014
  See application file for complete search history.

(56) References Cited

U.S. PATENT DOCUMENTS

| | | | |
|---|---|---|---|
| 4,906,070 A | 3/1990 | Cobb | |
| 5,235,467 A | 8/1993 | Nagamachi | |
| 5,836,664 A | 11/1998 | Conner et al. | |
| 7,111,961 B2 * | 9/2006 | Trenchard | F21S 9/035 362/235 |
| 7,118,253 B1 * | 10/2006 | Simon | 362/328 |
| 7,559,672 B1 * | 7/2009 | Parkyn et al. | 362/244 |
| 2005/0024744 A1 | 2/2005 | Falicoff et al. | |
| 2005/0281034 A1 * | 12/2005 | Summerford et al. | 362/304 |
| 2009/0225543 A1 | 9/2009 | Jacobson et al. | |
| 2010/0195335 A1 | 8/2010 | Allen et al. | |
| 2011/0141729 A1 | 6/2011 | Yang et al. | |
| 2011/0228528 A1 | 9/2011 | Yang et al. | |

(Continued)

FOREIGN PATENT DOCUMENTS

EP  2367045 A1  9/2011

OTHER PUBLICATIONS

PCT Search Report and Written Opinion issued in connection with corresponding Application No. PCT/US2014/062804 on Jan. 28, 2015.

*Primary Examiner* — Bao Q Truong
(74) *Attorney, Agent, or Firm* — GE Global Patent Operation; Peter T. DiMauro

(57) ABSTRACT

Embodiments of a lamp that distributes light from one or more light emitting diode (LED) devices with an intensity distribution having a batwing appearance. These embodiments can comprise a lens having a lens body with different types of optics to achieve the preferred distribution. In one example, the lens body has a first section with optics that embody a plurality of prismatic facets and a second section with optics that form a convex shape, curving outward relative to the LED device.

9 Claims, 6 Drawing Sheets

(56) References Cited

U.S. PATENT DOCUMENTS

| | | |
|---|---|---|
| 2012/0113621 A1 | 5/2012 | Lee et al. |
| 2012/0262050 A1* | 10/2012 | Fan .................. F21V 5/02 313/317 |
| 2012/0299017 A1 | 11/2012 | Chen et al. |
| 2012/0299018 A1 | 11/2012 | Chen et al. |
| 2013/0021794 A1 | 1/2013 | Chinniah et al. |
| 2013/0083555 A1 | 4/2013 | Chen et al. |
| 2013/0141909 A1 | 6/2013 | Ashdown et al. |
| 2013/0201680 A1 | 8/2013 | Allen et al. |
| 2013/0201722 A1 | 8/2013 | Yoder et al. |
| 2013/0208487 A1 | 8/2013 | Hsieh et al. |
| 2013/0258656 A1 | 10/2013 | Chin |

\* cited by examiner

LAMP HAVING LENS ELEMENT FOR DISTRIBUTING LIGHT

BACKGROUND

The subject matter of the present disclosure relates to illumination arts, lighting arts, solid-state lighting arts, and related arts.

Improvements in lighting technology often rely on finite light sources (e.g., light-emitting diode (LED) devices) to generate light. In many applications, LED devices offer superior performance to conventional light sources (e.g., incandescent and halogen lamps). However, all LED devices produce a near Lambertian intensity distribution. This characteristic of LED devices causes light from a bare LED device to impinge on a flat target surface with an illuminance distribution that is uneven and/or that varies across the flat target surface. For at least this reason, lighting devices will often utilize a lens that can distribute light to achieve a more uniform illuminance distribution on the flat target surface.

BRIEF SUMMARY OF THE INVENTION

This disclosure describes embodiments of a lamp with a lens that can distribute light from LED devices and other finite light sources with an intensity distribution having a batwing appearance. This intensity distribution is useful to uniformly illuminate flat surfaces. As set forth more below, examples of the lens combine different types of optics that can bend light to achieve the batwing appearance. The construction can also scale the strength of the batwing appearance by adjusting the size of the lens relative to the size of the light source.

This disclosure describes, in one embodiment, a lamp that comprises a light source forming an optical axis, and a lens disposed in position to receive light from the light source. The lens has a body with a top, a bottom, an inner surface proximate the optical axis, and an outer surface. The body has a first surface, selected from one of the inner surface and the outer surface, that is disposed at an angle greater than 0° and less than 90° as measured between the optical axis and a plane that is tangent to at least one point on the first surface. The body also has a second surface, selected from one of the inner surface and the outer surface and which is different from the first surface, that has a first section proximate the top in which the second surface forms a first optic and a second section proximate the bottom in which the second surface forms a second optic that is different from the first optic.

This disclosure describes, in another embodiment, a lamp that comprises a light emitting diode device forming an optical axis, a lens disposed in position to receive light from the light emitting diode device. The lens comprises an inner surface proximate the optical axis, an outer surface, and an opening exposing the inner surface to light from the light emitting diode device. The inner surface is disposed at an angle that is greater than 0° degrees and less than 90° as measured between the optical axis and a plane that is tangent to at least one point on the inner surface. The outer surface comprises a first optic and as second optic that are configured to direct light at different distribution angles.

This disclosure describes, in yet another embodiment, a lens comprises a body with a centerline and a cross-section profile, the cross-section profile defining a first surface and a second surface on the body. The first surface is disposed at an angle that is greater than 0° degrees and less than 90° as measured between the centerline and a plane that is tangent to at least one point on the first surface. The second surface has a first section forming a plurality of prismatic shapes and a second section that forms a convex shape that curves away from the centerline.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION OF THE INVENTION

Figure 1:
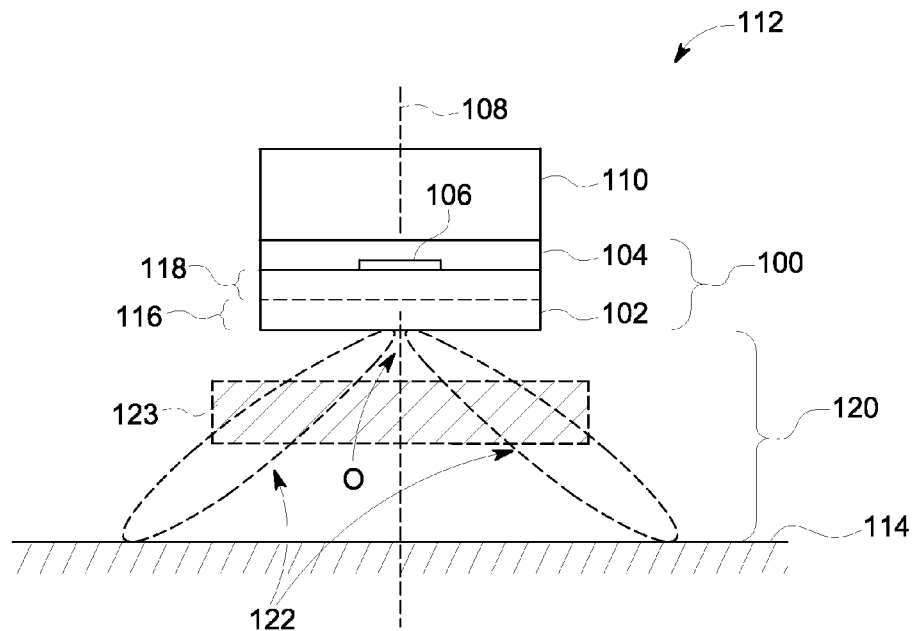
FIG. 1 depicts a schematic diagram of an exemplary embodiment of a lamp having an intensity distribution with a batwing appearance.

FIG. 1 illustrates a schematic diagram of an exemplary embodiment of a lamp 100. The lamp 100 includes a lens 102 and a lamp body 104. The lamp 100 also includes a light source 106 that generates light in a direction of an optical axis 108. The lamp body 104 may include a connector as well as a variety of electrical components and circuitry that drive and control the light source 106. Examples of the connector can couple the lamp body 104 with a fixture 110, which may provide an Edison-type lamp socket and/or other types of sockets and connectors to conduct electricity to the components of the lamp body 104. The resulting connection between the lamp 100 and the fixture 110 can form a lighting system 112 that distributes light onto a surface 114 (e.g., a flat and/or relatively flat surface). As explained more below, the lens 102 can have one or more optical sections (e.g., a first optical section 116 and a second optical section 118). The optical sections 116, 118 can distribute light from the light source 106 in a defined pattern 120 that forms an intensity distribution 122 with an origin O. In one implementation, the lamp 100 and/or the lighting system 112 may incorporate one or more peripheral optical elements 123 that can receive light from the lamp 100. Examples of the peripheral optical elements 123 can have optics with optical properties to modify the distribution of light from the lamp 100.

Examples of the lens 102 can form intensity distributions that achieve, inter alia, uniform illuminance on the surface 114. These examples can achieve a batwing appearance or shape, an example of which is illustrated in FIG. 1 by the two peripheral zones or "lobes" of the intensity distribution 122. This disclosure also contemplates configuration of the lens 102 that can achieve other intensity distributions (e.g., both Lambertian and non-Lambertian) that provide both uniform and non-uniform illuminance on the surface 114. Focusing, for purposes of discussion, on designs of the lens 102 that can generate the batwing appearance or shapes, these designs can provide substantially uniform illuminance on the surface 114 up to a specified cut-off angle measured from the optical axis 108. The resulting intensity distribution may follow a curve defined by Equation (1) below:

$$I=(\cos \theta)^{-3}, \quad \text{Equation (1)}$$

where I is the intensity distribution and $\theta$ is the cut-off angle measured from the optical axis 108 to a line (or plane) that extends from the origin O to a point at which the illuminance on the surface 114 goes to zero. In another example, the cut-off angle $\theta$ is defined as the angle, measured from zero, beyond which the intensity of light is approximately zero (i.e., there is not light). Intensity distributions that follow the curve that the Equation (1) generates, also referred to as an "inverted cosine cube function," will provide perfectly uniform illuminance on the surface 114. Designs for the lens 102 can also generate intensity distributions that deviate from perfectly uniform illuminance on the surface 114. The intensity distribution for these designs do not necessarily follow the inverted cosine cube function, but instead the intensity distribution exhibits intensity proximate the optical axis 108 that is higher relative to the intensity predicted by the inverted cosine cube function. These variations can change the shape of the intensity distribution 122 from the batwing appearance shown in FIG. 1 to, in one example, a shape that looks like an isosceles triangle with one point at the origin O.

Configurations for the optical sections 116, 118 form optics that bend light from finite light sources to form the intensity distribution 122. Examples of the finite light sources include light emitting diode (LED) devices and devices having construction that utilize, or incorporate, solid-state lighting technologies. At a relatively high level, the optics can have geometry that reflect freeform and planar optics. Freeform optics can take any shape and are not restricted to conic sections. Planar optics comprise primarily flat surfaces and, in one example, the optics comprise only flat surfaces. In one implementation, the geometry in one or both of the optical sections 116, 118 comports with optics found on a Fresnel lens.

The optics can take different forms in each of the optical sections 116, 118. For example, the optics can have a first form for use in the first section 116 and a second form for use in the second section 118. As noted below, the first form of the optics in the first optical section 116 can include prismatic facets that are spaced apart from the light source 106, and from one another, along the optical axis 108. The second form for the second optical section 118 can include one or more optics with an arcuate shape. Collectively, the combination of the optics of the lens 102 can generate a pattern for the light that is consistent with the defined pattern 120. The pattern finds use in street lamps and various overhead lighting, although this disclosure contemplates broad application that benefit from the uniform distribution of light of designs and construction of the lamp 100 that comport with scope and spirit of the present disclosure.

Figure 2:
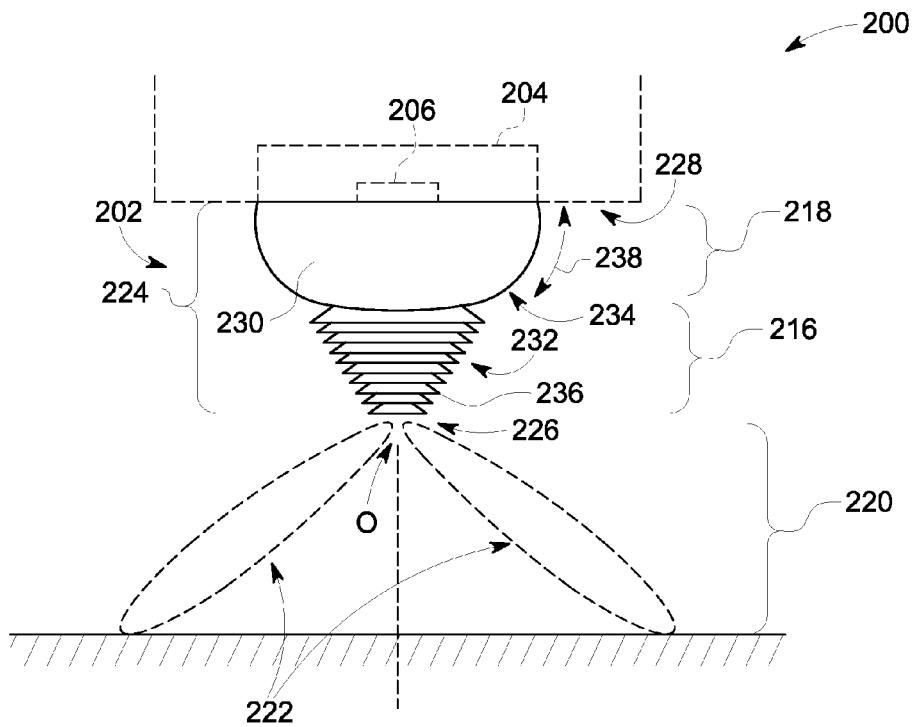
FIG. 2 depicts a side, elevation view of an exemplary embodiment of a lamp having an intensity distribution with a batwing appearance.
Figure 3:
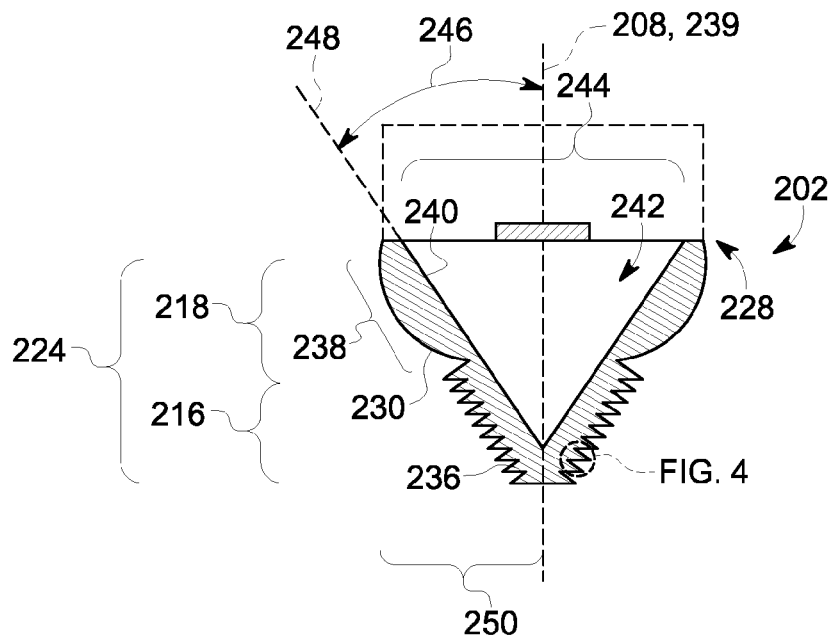
FIG. 3 depicts cross-section view of the lamp of FIG. 2.

FIGS. 2 and 3 illustrate an exemplary embodiment of a lamp 200 that can generate light in the defined pattern 220 contemplated herein. In FIG. 2, the lens 202 has a lens body 224 with a top 226 and a bottom 228 that couples with the base 204. The lens body 224 also has an outer surface 230. In each of the sections 216, 218, the outer surface 230 has contours that modify the light-distributing properties of the lens 202 to achieve the intensity distribution 222. For example, the contours may form one or more optics, e.g., a first optic 232 and a second optic 234 in, respectively, the first section 216 and the second section 218. For the first optic 232, the contours form the outer surface 230 into one or more prismatic facets 236. The contours in the second section 218 form the outer surface 230 into a convex shape 238 having positive concavity relative to the light source 206.

In the cross-section view of FIG. 3, the lens body 224 has a centerplane 239 that aligns with the optical axis 208 and an inner surface 240 that bounds an interior volume 242. The lens body 224 can also have a first opening 244 at the bottom 228 that allows access to the interior volume 242. The inner surface 240 is disposed at an angle 246 from the optical axis 208. In one example, the angle 246 defines the angular offset as measured between the optical axis 208 and a plane 248 tangent to at least one point on the inner surface 240. The angle 246 can have values greater than 0° and less than 90° and, in one example, the value is in a range of from about 20° to about 30°. Collectively, the features of the lens body 224 form a cross-section profile 250 that defines the contours of the outer surface 230 and the inner surface 240. The cross-section profile 250 can have an outer profile that defines the contours of the outer surface 230 and an inner profile that defines the contours of the inner surface 240.

This disclosure also contemplates configurations of the cross-section profile 250 in which the contours of the outer surface 230 and the inner surface 240 are switched. That is, the configuration can define the lens body 224 as having a first surface and second surface, each being selected from one of the outer surface 230 and the inner surface 232. In one example, the first surface will have the contours of the outer profile and the second surface will have the contours of the inner profile. In another example, the first surface will have the contours of the inner profile and the second surface will have the contours of the outer profile.

The lens body 224 can comprise materials of various types and compositions including glass and/or plastics (e.g., poly(methyl methacrylate) (PMMA), polycarbonate, etc.) as well as similar light transmitting materials. In one example, the lens body 224 comprises an optically clear material, which can minimize back reflection and maintain high optical efficiency. This disclosure does, however, contemplate configurations of the lens body 224 that may benefit from material that comprises light scattering and/or reflective light scattering particles mixed within a bulk material.

Figure 4:
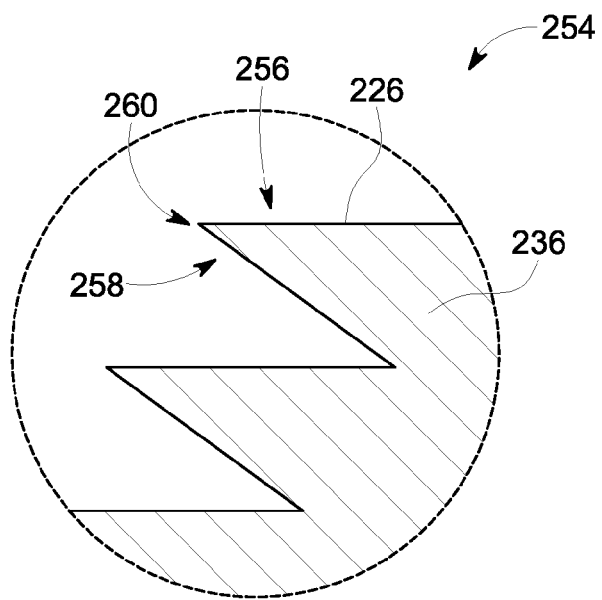
FIG. 4 depicts a detail view of the lamp of FIG. 2.

The detail view of FIG. 4 illustrates an exemplary configuration 254 that defines geometry for the prismatic facets 236. The prismatic facet 236 in the present example has an upper surface 256 and a lower surface 258 that adjoins the upper surface 256 at an angle forming an outer end 260. As noted above, design of the prismatic facets 236 and, more particularly, the upper surface 256 and the lower surface 258 can assume any combination of planar, curved, and freeform geometry. These different geometries include geometries found on and/or commonly associated with construction off facets on Fresnel lenses. In one implementation, the upper surface 256 can be curved, e.g., upward along the optical axis, and the lower surface 258 can form a plane and/or planar surface. This disclosure, however, contemplates that the prismatic facets 236 can assume a variety of shapes, sizes, and like geometry, as desired. The outer end 260 can, for example, assume the pointed and/or angular shape (as shown in FIG. 4). In other examples, the outer end 260 may be rounded and/or arcuate. Likewise, the lower surface 258 can assume a more shallow and/or more steep angle, relative to the upper surface 256.

Figure 5:
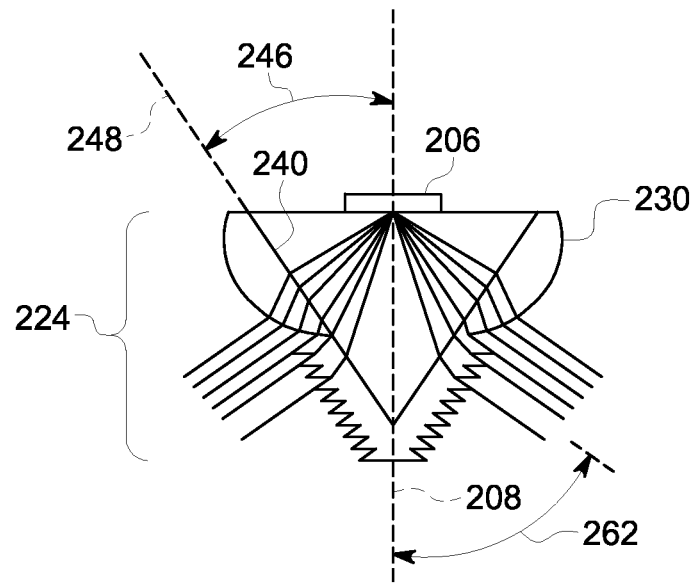
FIG. 5 depicts a schematic diagram of a ray trace for the lamp of FIG. 2.

FIG. 5 depicts a schematic diagram of a ray trace to illustrate, in general terms, the bending properties of the lens body 224. In one example, the bending properties re-direct the light at both the inner surface 240 (the "entrance surface") and at the outer surface 230 (the "exit surface"). The light can exit the exit surface at a distribution angle 262 relative to the optical axis 208. During operation, light from the light source 206 impinges on the inner surface 240 of the lens body 224. The angle 246 of the inner surface 240, in combination with the contours and optics of the outer surface 230, can bend the light on either side of the optical axis 208. Values of the distribution angle 262 depend, at least in part, on the value for the angle 246 of the inner surface 240. In one example, a value of 30° for the angle 246 can result in a value of 60° for the distribution angle 262.

Figure 6:
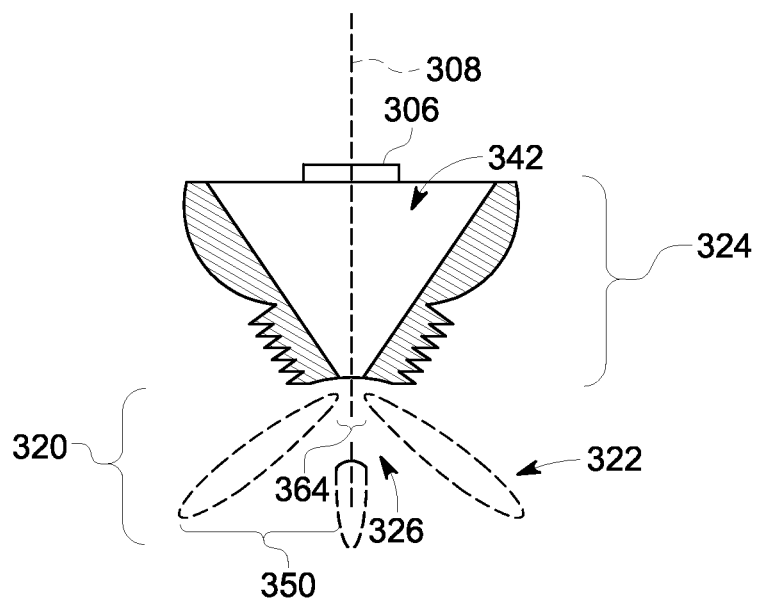
FIG. 6 depicts a side, elevation, cross-section view of an example of a lens for use with the lamp of FIG. 1.
Figure 7:
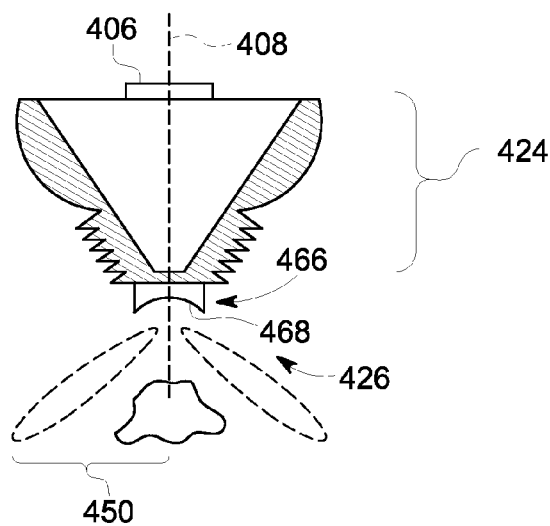
FIG. 7 depicts a side, elevation, cross-section view of an example of a lens for use with the lamp of FIG. 1.

FIGS. 6 and 7 illustrate cross-sections of an exemplary embodiment of a lamp of FIG. 6, and a lamp of FIG. 7. These embodiments utilize different lens configurations to modify the distribution of light from each lamp. In the lens configuration of FIG. 6, the lens body 324 has a cross-section profile 350 that forms a frusto-conical shape that includes a second opening 364 at the top 326. The second opening 364 allows access to the interior volume 342. During operation, light from the light source 306 will emit through the opening 364, thereby providing light with greater intensity proximate the optical axis 308 in addition to the intensity distribution 322 contemplated herein.

The lens configuration of FIG. 7 modifies the frusto-conical shape. The lens body 424 includes an optic 466 with an optic surface 468 of varying geometry disposed at the top 426 of the lens body 424. Examples of the optic 466 can modify the distribution of light proximate the optical axis 408. The optic 466 can integrate with construction of the lens body 424, e.g., as part of the cross-section profile 450. In other examples, the optic 466 can embody one or more separate components that affix to the lens body 424. In the present example, the optic surface 468 curves with negative concavity relative to the light source 406.

Broadly, the curvature of the optic surface 468 serves to spread light in the central portion of the intensity distribution. For example, the optic surface 468 can impart additional optical properties (e.g., light-spreading, light-focusing, etc.) to affect the distribution light that impinges on the optic 466. In addition to negative concavity, the optic surface 468 can assume different curvatures (e.g., positive concavity of varying degrees, more and/or less negative concavity, freeform, etc.) that can modify the optical properties of the optic 466. In one implementation, the optic 466 comprises a volume diffusing element to achieve certain optical properties. Examples of the volume diffusing element can comprise materials described herein, including optically clear mediums with light scattering particles distributed therein.

Figure 8:
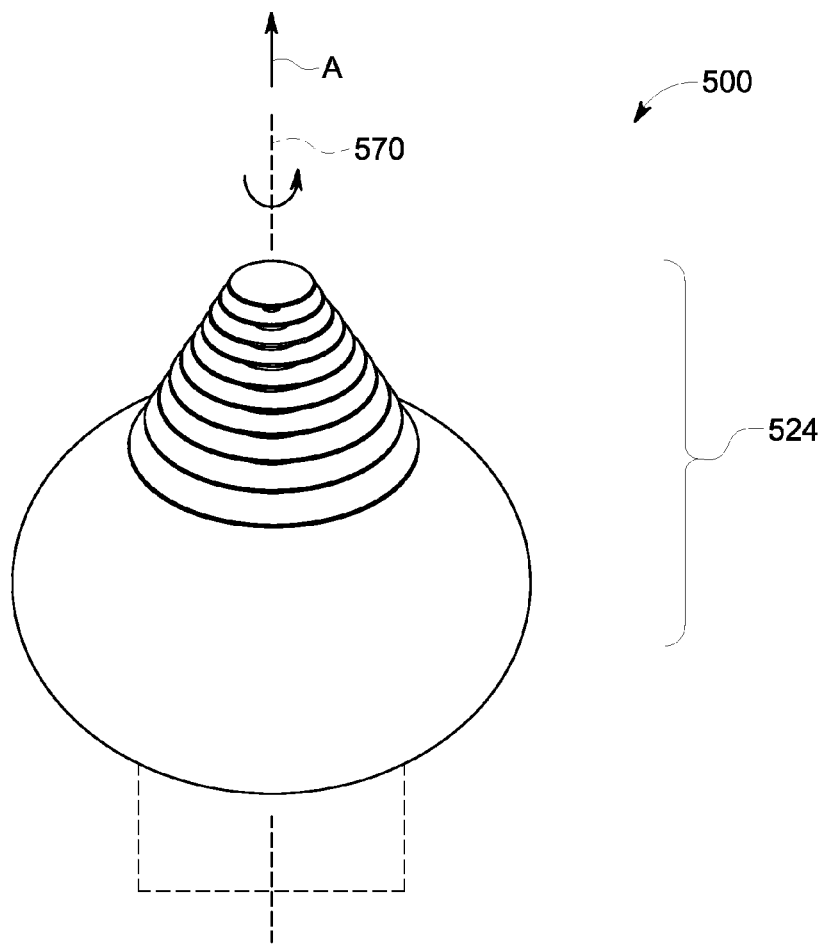
FIG. 8 depicts a perspective view of an example of a lens for use with the lamp of FIG. 1.
Figure 9:
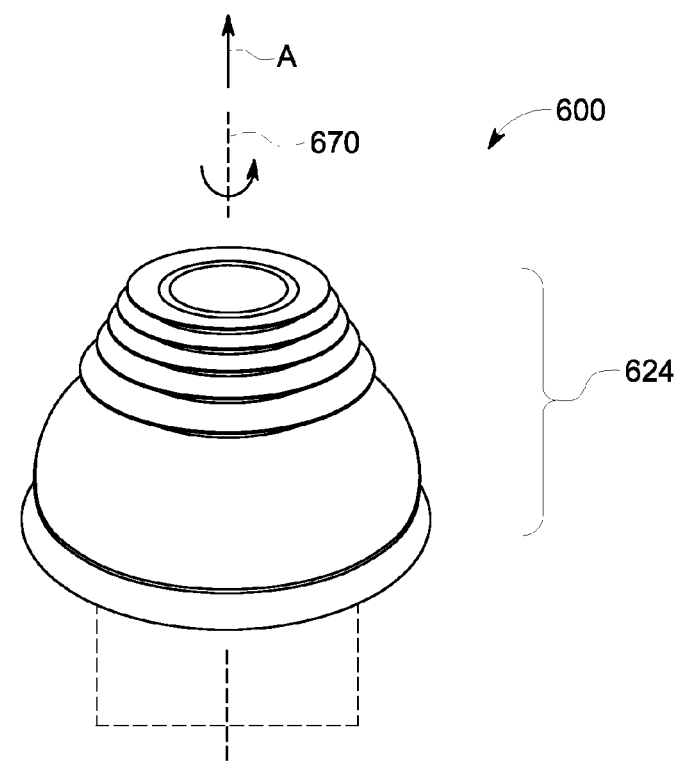
FIG. 9 depicts a perspective view of an example of a lens for use with the lamp of FIG. 1.
Figure 10:
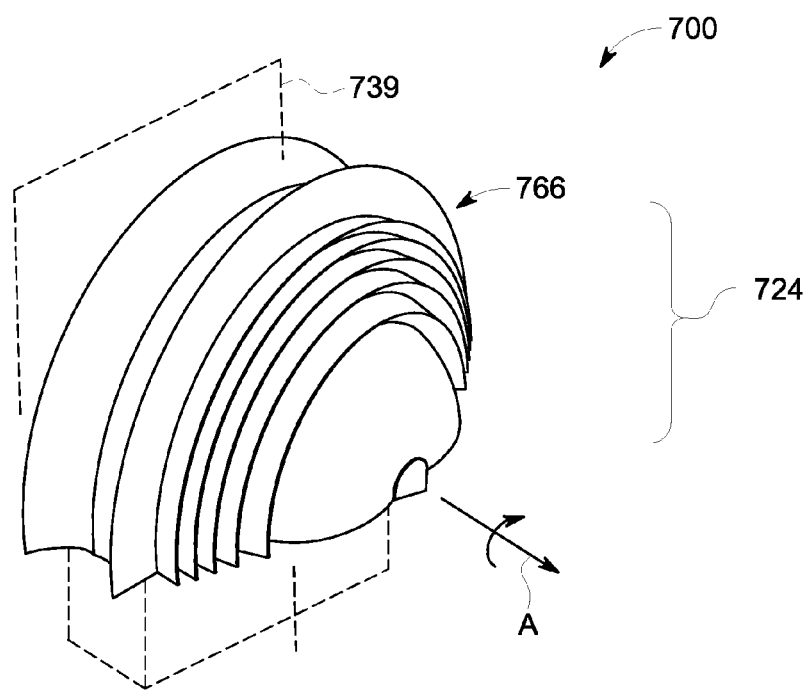
FIG. 10 depicts a perspective view of an example of a lens for use with the lamp of FIG. 1.
Figure 11:
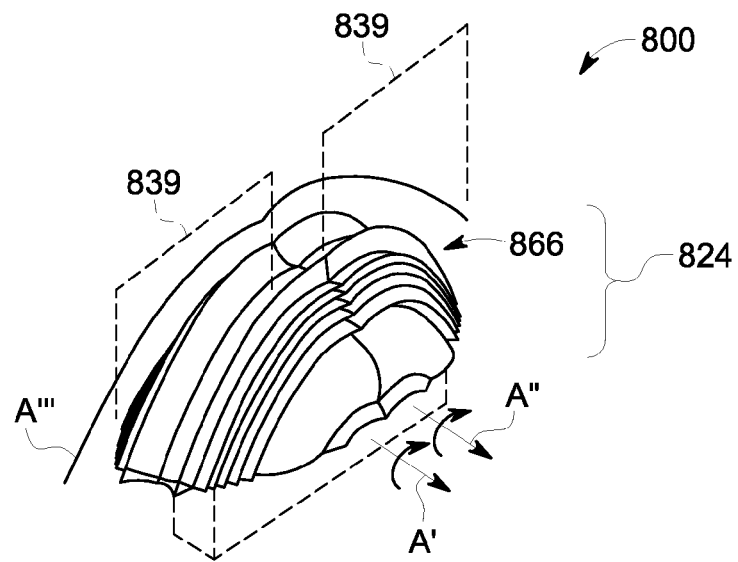
FIG. 11 depicts a perspective view of an example of a lens for use with the lamp of FIG. 1.

FIGS. 8, 9, 10, and 11 depict diagrams of lamps that incorporate lenses of varying construction to achieve the intensity distribution contemplated herein. These lenses have a lens body with a shape that results from revolving a cross-section profile relative to a manufacture axis. This construction forms annular optics that can embody the concentric prismatic facets and/or the convex optics discussed above. FIGS. 8 and 9 depict examples of a lamp 500 (FIG. 8) and a lamp 600 (FIG. 9) with a manufacture axis A that aligns with a centerline 570, 670 of the lens body 524, 624. The shape of the lens body 524 results from revolving the cross-section 250 (FIG. 3) in circular fashion about the manufacture axis A. The shape of the lens body 624 results from revolving the cross-section 350 (FIG. 6) in circular fashion about the manufacture axis A. FIGS. 10 and 11 depict examples of a lamp 700 (FIG. 10) and a lamp 800 (FIG. 11). In these examples, the manufacture axis A is disposed perpendicular to the centerplane 739, 839. The shape of the lens body 724, 824 results from revolving the cross-section 450 (FIG. 7) in circular fashion about the manufacture axis A. This configuration includes the optic 766, 866. In FIG. 11, the lens body 824 comprises a pair of revolved sections, one each revolved in circular fashion about the manufacture axis A' and A". Alternatively, construction of the lens body 824 can sweep the cross-section 450 (FIG. 7) along a pre-defined guide path A'''.

Notably, the lamp 700 (FIG. 10) and the lamp 800 (FIG. 11) can generate intensity distributions that are rectangular in shape, as opposed to symmetric about the optical axis (e.g., optical axis 108 of FIG. 1). For both the lamps 700, 800, the intensity distribution in the direction of the manufacture axis A, A' and A" will have a batwing appearance (also shape). The intensity distribution in a direction perpendicular to the centerplane 739, 839 will be Lambertian (in lamp 700) or near Lambertian (in lamp 800). These types of non-symmetrical intensity distributions can be highly desirable for specific applications where non-circular surfaces require illumination.

Figure 12:
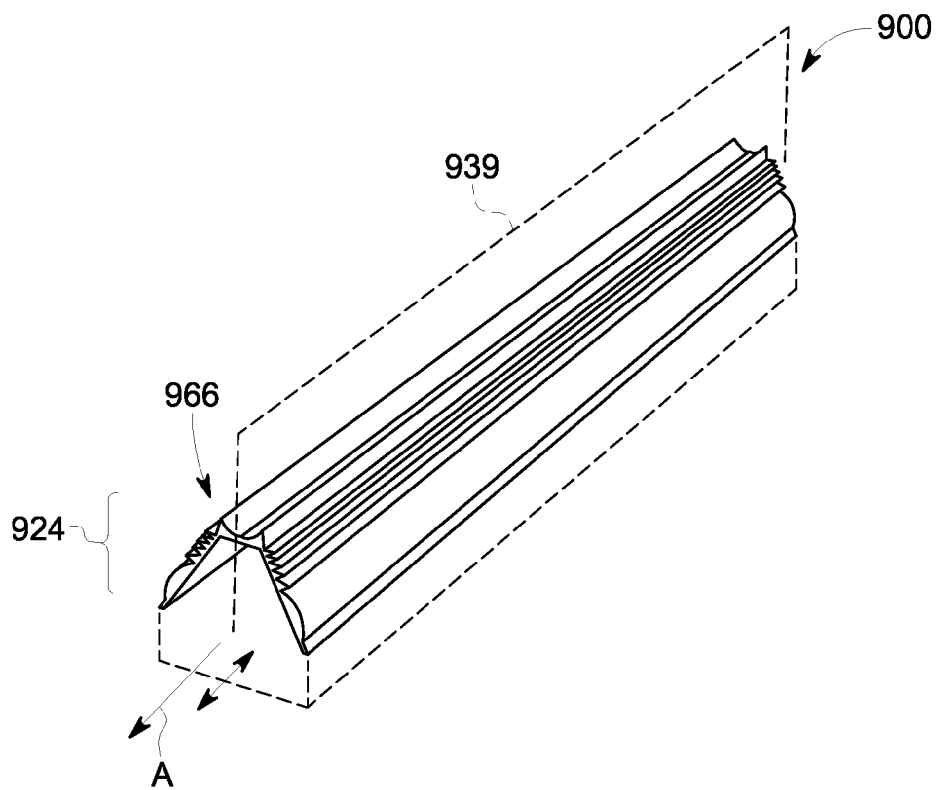
FIG. 12 depicts a perspective view of an example of a lens for use with the lamp of FIG. 1.

FIG. 12 depicts an example of a lamp 900 that incorporates a lens made from extruded and/or elongated design. The lamp 900 has a manufacture axis A that is disposed perpendicular to the centerplane 939. The shape of the lens body 924 results from extruding the cross-section 450 (FIG. 7) along the manufacture axis A to form an elongated element. This configuration also includes the optic 966. Examples of the elongated element may find use in replacement devices that utilize LED devices to replace fluorescent bulbs. Although shown as symmetric about the centerplane 939, the disclosure contemplates construction of the elongated element in which the cross-section profiles on either side of the centerplane 939 are not symmetric, e.g., the inner surface is disposed at different angles on each side of the centerplane 939.

In light of the foregoing, embodiments of the lamps discussed herein can distribute light from finite point sources with a batwing appearance. This feature permits these embodiments for use as replacement to conventional lighting technology (e.g., incandescent, halogen, etc.) found in street lamps and other overhead lighting applications. The design and construction proposed herein is also amenable to modifications in the batwing appearance; for example, the lamps can incorporate a lens that can be designed to match distribution characteristics with different size light sources. For example, increasing the source size relative to the lens will result in a decrease in the ratio of the peak intensity at the cut-off angle to the on-axis intensity.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lighting system, comprising:
   a light source comprising a light emitting diode device and having an optical axis; and
   a lens disposed in position to receive light from the light source, the lens having a body with a top, a bottom, an inner surface proximate the optical axis, and an outer surface;
   wherein the inner surface is disposed at an angle greater than 0° and less than 90° as measured between the optical axis and a plane that is tangent to at least one point on the inner surface; and
   wherein the outer surface comprises:
      a first section proximate the top in which the outer surface forms a first optic, wherein the first optic comprises a plurality of prismatic facets, and
      a second section proximate the bottom in which the outer surface forms a second optic, wherein the second optic comprises geometry that causes the outer surface to curve convexly away from the optical axis.

2. The lighting system of claim 1, further comprising a third optic disposed at the top of the lens and aligned with the optical axis, the third optic in position to receive light from the light source.

3. The lighting system of claim 2, wherein the third optic has optical properties for spreading the light.

4. The lighting system of claim 2, wherein the third optic comprises an optically clear material with light scattering particles distributed therein.

5. The lighting system of claim 2, wherein the body integrates monolithically with the third optic.

6. The lighting system of claim 1, wherein the first optic and the second optic are configured to cause the lens to distribute light with a first intensity distribution having a batwing appearance.

7. The lighting system of claim 1, wherein the lens has a cross-section profile that includes a second opening at the top.

8. A lens, comprising:
   a body with a centerplane and a cross-section profile, the cross-section profile defining an inner surface and a outer surface, wherein the inner surface is disposed at an angle that is greater than 0° degrees and less than 90° as measured between the centerplane and a plane that is tangent to at least one point on the inner surface, and
   wherein the outer surface comprises a first section forming a plurality of prismatic shapes and a second section that forms a convex shape that curves away from the centerplane;
   wherein the body forms an elongated element that corresponds to extruding the cross-section profile along a manufacture axis that is perpendicular to the centerplane.

9. The lens of claim 8, wherein the cross-section profile has a frusto-conical shape.

* * * * *